US007712509B2

(12) United States Patent
Constantine

(10) Patent No.: US 7,712,509 B2

(45) Date of Patent: May 11, 2010

(54) PRODUCE LABELER WITH MULTIPLE CASSETTES AT A SINGLE STATION

(75) Inventor: Alan Constantine, Norwich (GB)

(73) Assignee: Sinclair Systems International, LLC, Fresno, CA (US)

( * ) Notice: Subject to any disclaimer, the term of this patent is extended or adjusted under 35 U.S.C. 154(b) by 785 days.

(21) Appl. No.: 11/599,792

(22) Filed: Nov. 15, 2006

(65) Prior Publication Data

US 2007/0074819 A1 Apr. 5, 2007

Related U.S. Application Data

(63) Continuation-in-part of application No. 11/227,723, filed on Sep. 14, 2005, now abandoned.

(60) Provisional application No. 60/737,221, filed on Nov. 16, 2005.

(51) Int. Cl.

| | |
|---|---|
| ***B65C 9/10*** | (2006.01) |
| ***B65C 9/30*** | (2006.01) |
| ***B32B 37/10*** | (2006.01) |
| ***B32B 37/22*** | (2006.01) |
| ***B32B 38/10*** | (2006.01) |
| *B65C 9/20* | (2006.01) |

(52) U.S. Cl. ...................................... 156/582; 156/567

(58) Field of Classification Search ................. 156/567, 156/582

See application file for complete search history.

(56) References Cited

U.S. PATENT DOCUMENTS

| | | | | |
|---|---|---|---|---|
| 4,021,293 | A * | 5/1977 | Total | 156/568 |
| 4,242,168 | A * | 12/1980 | Carter | 156/357 |
| 4,302,277 | A * | 11/1981 | Ilsemann | 156/567 |
| 4,594,123 | A * | 6/1986 | Eder | 156/456 |
| 4,747,905 | A * | 5/1988 | Ilsemann | 156/542 |
| 5,645,680 | A * | 7/1997 | Rietheimer | 156/567 |
| 5,788,284 | A * | 8/1998 | Hirst | 283/81 |
| 6,047,755 | A * | 4/2000 | Anderson et al. | 156/351 |
| 6,179,030 | B1 * | 1/2001 | Rietheimer | 156/360 |
| 6,257,294 | B1 * | 7/2001 | Weisbeck | 156/356 |

FOREIGN PATENT DOCUMENTS

| | | | |
|---|---|---|---|
| WO | WO 2007059204 | A2 * | 5/2007 |
| WO | WO 2007059204 | A3 * | 11/2007 |

* cited by examiner

*Primary Examiner*—Philip C Tucker
*Assistant Examiner*—Sonya Mazumdar
(74) *Attorney, Agent, or Firm*—Bruce H. Johnsonbaugh

(57) ABSTRACT

An automatic apparatus for applying labels to produce is provided which utilizes three or more label cassettes angularly disposed in coplanar fashion adjacent a rotary bellows applicator. The cassettes may include labels indicating different sizes or grades of produce, for example, and each produce item being labeled may have a label selected from any one of said multiple cassettes. High label speeds in excess of 1000 labels per minute are achieved along with selective labeling.

5 Claims, 8 Drawing Sheets

PRODUCE LABELER WITH MULTIPLE CASSETTES AT A SINGLE STATION

CROSS-REFERENCE TO RELATED APPLICATIONS

This application is a Continuation-in-Part of U.S. application Ser. No. 11/227,723 filed on Sep. 14, 2005 now abandoned. This application claims the benefit of and priority from U.S. provisional application Ser. No. 60/737,221 filed on Nov. 16, 2005.

BACKGROUND AND BRIEF SUMMARY OF INVENTION

This invention relates to produce labelers and, in particular, to selectively labeling a wide variety of fresh produce by size or grade at high speed.

Within the fruit packing industry it has become common practice for fruit to be labeled in large quantities at high speed on sizing/grading equipment. The demand for labeling is driven mainly by the retail industry, requiring product to be identified by variety and/or source and furthermore by size and quality. As a consequence, packers are commonly required to apply a number of different labels to fresh produce during the grading and packing operation. This is generally achieved by installing multiple labeling stations in sequence over the grading conveyors. Two major drawbacks exist with this arrangement: (a) the extended space required to accommodate multiple labeling stations, and (b) the resulting higher costs attached to such installations.

For example, if peaches are to be labeled "small, medium or large," the peaches typically pass through sizing equipment where three banks of labeling equipment are used to apply the appropriate size labels to the sized peaches. The 3 labeling stations (including rotary bellows, etc.) all take up space and are all relatively expensive.

There is a clear need for labeling equipment that is more efficient and versatile than the prior art systems that use separate labeling stations for each separate size or grade of produce.

The closest prior art known to applicant includes the use of dual cassettes as shown in Rietheimer U.S. Pat. No. 5,645,680 (see FIG. 6). However, Rietheimer has three major weaknesses. First, he uses a complex fixed cam surface housing (as opposed to rotary bellows). Secondly, his system uses conventional knife edge label stripping and is therefore limited to the use of relatively stiff labels. Thirdly, Rietheimer requires that the guide plate of each label cassette discharge each label tangentially to the rotary applicator and parallel to each transfer head as shown in FIG. 6 herein. This geometry limits the number of cassettes usable to two (see FIG. 6). The present invention is capable of using three or more label cassettes without the complex camming mechanism of Rietheimer. The present invention also uses thin and flexible labels, which are usable on more items than stiff labels.

The present invention provides, for the first time, a single automatic labeling station capable of applying 3 or more different labels to singulated produce passing through the station. The present invention also provides, for the first time, a single automatic labeling station wherein 3 or more label cassettes interact with a single rotary bellows applicator.

In the above example of "small, medium and large" peaches to be labeled, the present invention labels all 3 separate sizes in a single station with a single rotary bellows applicator. The invention reduces most of the prior art machinery required and the space necessary to house the machinery!

A primary object is to provide an automatic produce labeling apparatus capable of applying 3 or more different labels at a single labeling station and at high speed, i.e., more than 1000 labels per minute.

A further object is to provide an automatic labeling system which eliminates the need for multiple labeling stations otherwise required by the prior art in applying labels displaying different sizes or grades on produce.

A further object is to provide labeling apparatus wherein multiple label cassettes interact with a single rotary bellows applicator to apply multiple different labels to produce at speeds in excess of 1000 labels per minute.

Further objects and advantages will become apparent from the following description and drawings wherein:

DETAILED DESCRIPTION OF THE DRAWINGS

Figure 1:
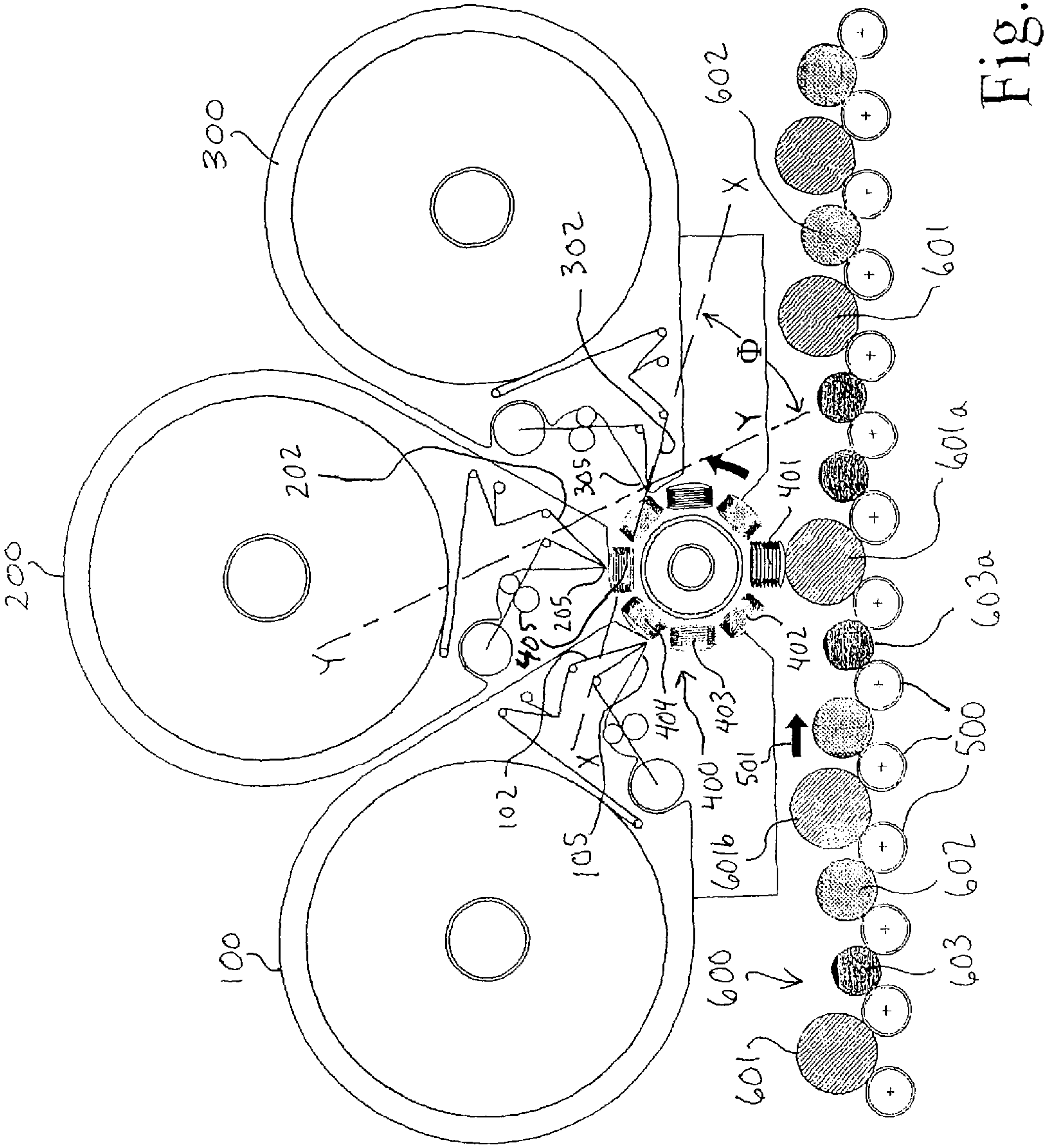
FIG. 1 is a schematic illustration of the present invention showing three separate label cassettes being utilized in conjunction with a single rotary bellows applicator.

FIG. 1 illustrates one form of the present invention wherein three separate label cassettes 100, 200 and 300 are co-planar and are angularly displaced from each other around and above a single rotary bellows applicator shown generally as 400. Cassettes 100, 200 and 300 form an arc of approximately 180°. A conveyor 500 moves in the direction of arrow 501 and carries produce shown generally as 600. The produce 600 includes, in the example illustrated in FIG. 1, three different sized items including "large" items 601, medium sized produce items shown as 602 and small items 603. Label cassettes 100, 200 and 300 carry different sized labels, e.g. label cassette 100 carrying "large" size labels, cassette 200 carrying "medium" labels and cassette 300 carrying "small" labels. In FIG. 1 a large produce item 601*a* is being labeled by the upper surface 401*a* of individual bellows 401. The "large" label was applied to individual bellows 401 three steps earlier in the process by cassette 100 cooperating with sensors known in the art. As shown in FIG. 1, individual bellows 404 is in the process of having a "large" size label transferred to its upper surface 404*a* from label cassette 100. That label will be applied in three successive steps to the "large" produce item

601*b*. By situating each of the three label cassettes 100, 200 and 300 as shown in FIG. 1, a single multi-cassette labeling station is provided for applying different size or grading labels to either different sized or different graded produce moving past rotary bellows applicator 400.

Figure 8:
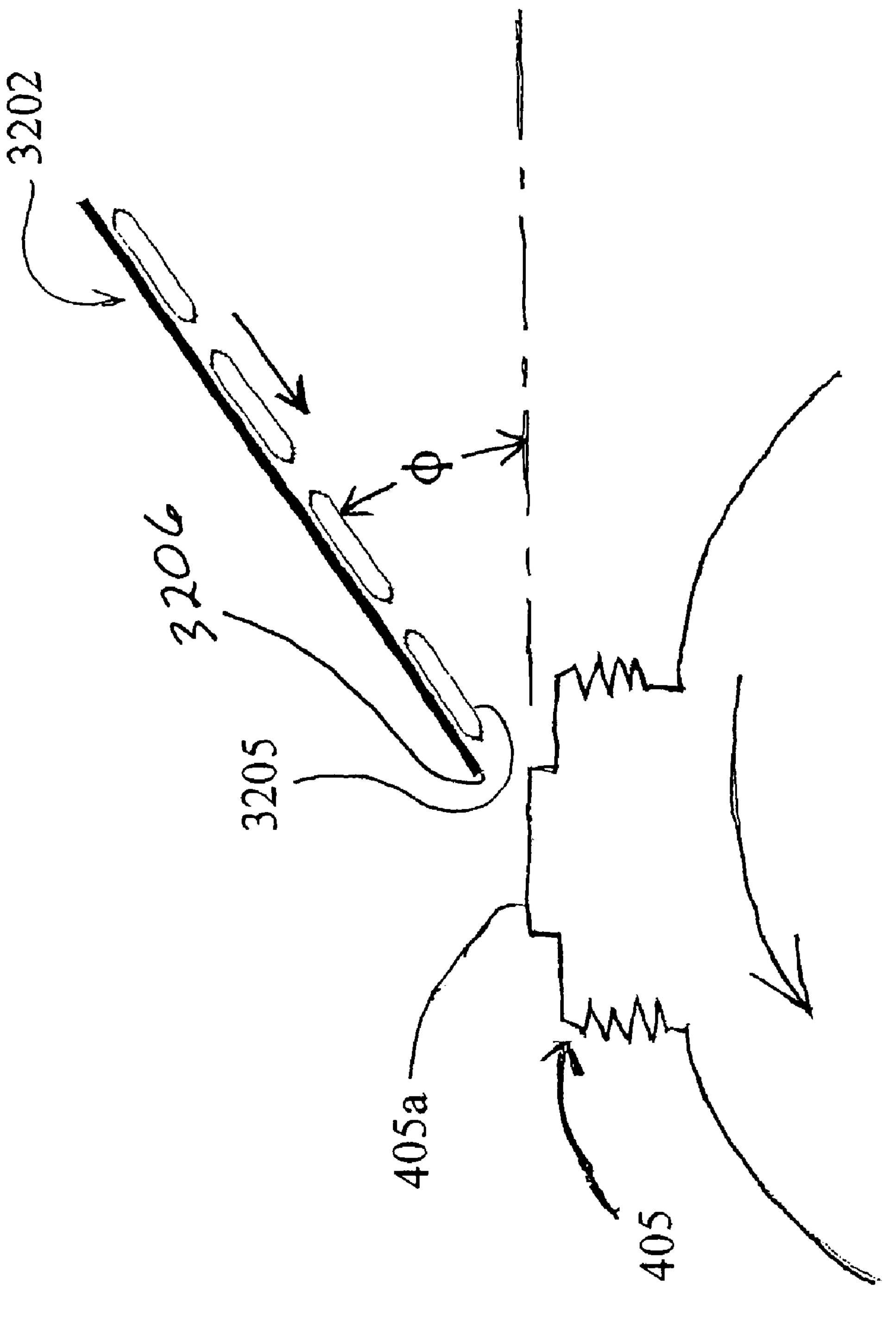
FIG. 8 is a reproduction of FIG. 7 from the parent '723 application.

A significant feature of the invention is the orientation of the guide plates 102, 202 and 302, respectively, relative to the outer or circumferential surface of rotary bellows applicator 400. This angular relationship is illustrated by the axis X-X which is aligned with the guide plate 302 of label cassette 300 and the axis Y-Y which is tangential to the upper surface of rotary bellows applicator 400 adjacent the stripper edge or tip 305 of guide plate 302. The angular relationship is shown as angle $\phi$. The angle $\phi$ is preferably in the range of 30° to 60° but can range from 10° to 90°. This angular relationship is shown most clearly in FIG. 8, where guide plate 3202 forms angle $\phi$ with the upper surface 405*a* of rotary bellows applicator 405, at a point in time when the upper surface 405*a* is adjacent the stripper edge 3305 as shown in FIG. 8. It is significant to note that prior art label cassettes known to the applicant must be aligned relative to a rotary bellows applicator so that the angle $\phi$ is zero degrees. This prior art design requirement would cause each of the label cassettes to be rotated approximately 30° clockwise in FIG. 1 about the tips 105, 205 and 305 of the guide plates. Such realignment of the cassettes has the consequence that only two of the cassettes of FIG. 1 could be arranged in the coplanar fashion above the rotary bellows applicator 400 if $\phi$ were zero.

The manner in which the labels are stripped from guide plates 102, 202 and 302 is shown and described in U.S. patent application Ser. No. 11/227,723 filed Sep. 14, 2005 (incorporated herein by reference) and is briefly described below in the interest of brevity.

Figure 2:
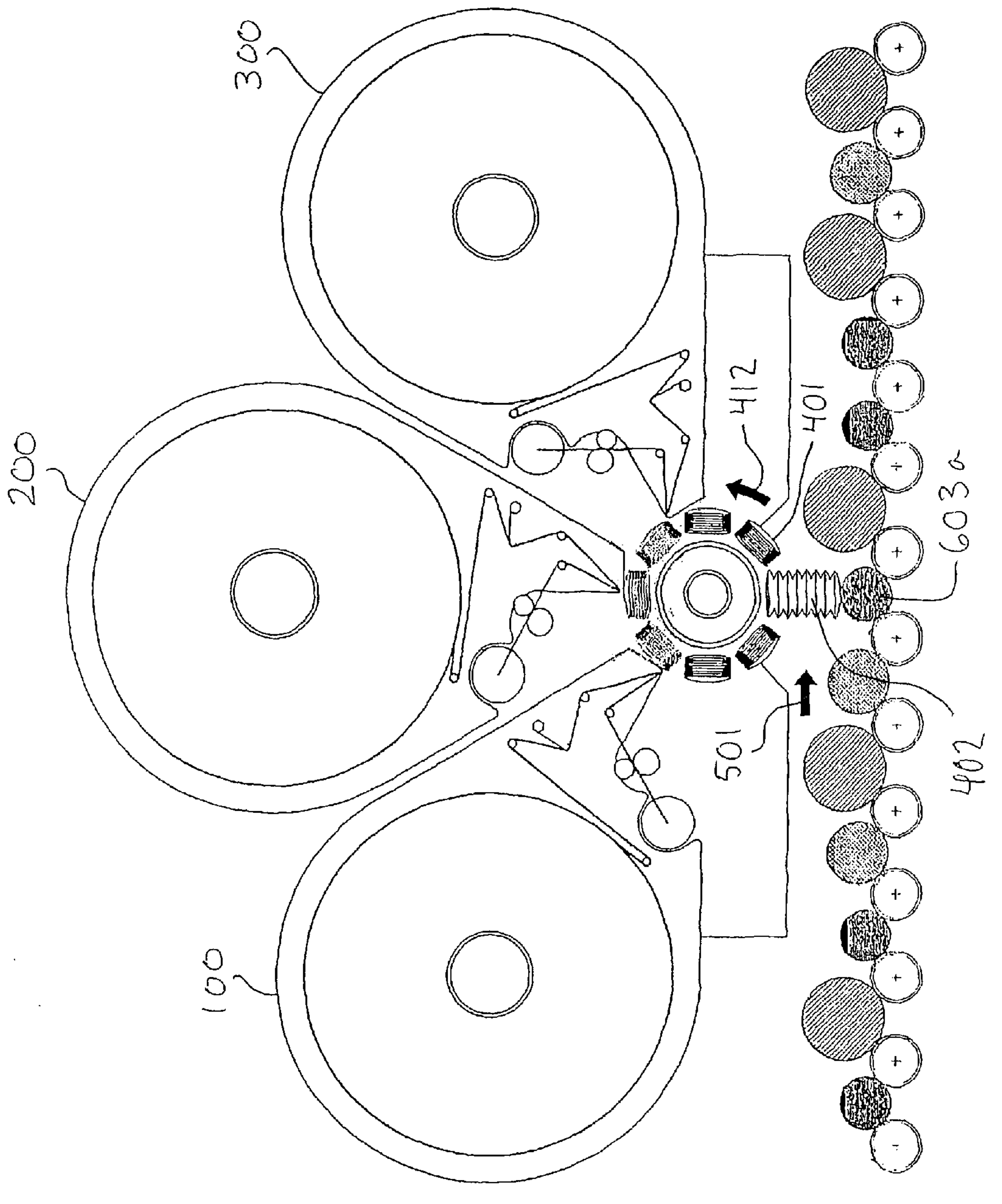
FIG. 2 is a schematic illustration of the system shown in FIG. 1 wherein the system has been advanced one step from that shown in FIG. 1.

FIG. 2 illustrates the system of FIG. 1 wherein the conveyor 500 and rotary bellows applicator 400 have moved one step in the direction of arrows 501 for the conveyor and 412 for the applicator. In this step, the individual bellows 401 has rotated counterclockwise one step and has been retracted. Bellows 402 has expanded fully in order to apply a "small" label to produce item 603*a*. The "small" label was transferred from label cassette 300 to rotary bellows 402 six steps earlier when sensors known in the art detected the "small" produce item 603*a*.

Figure 3:
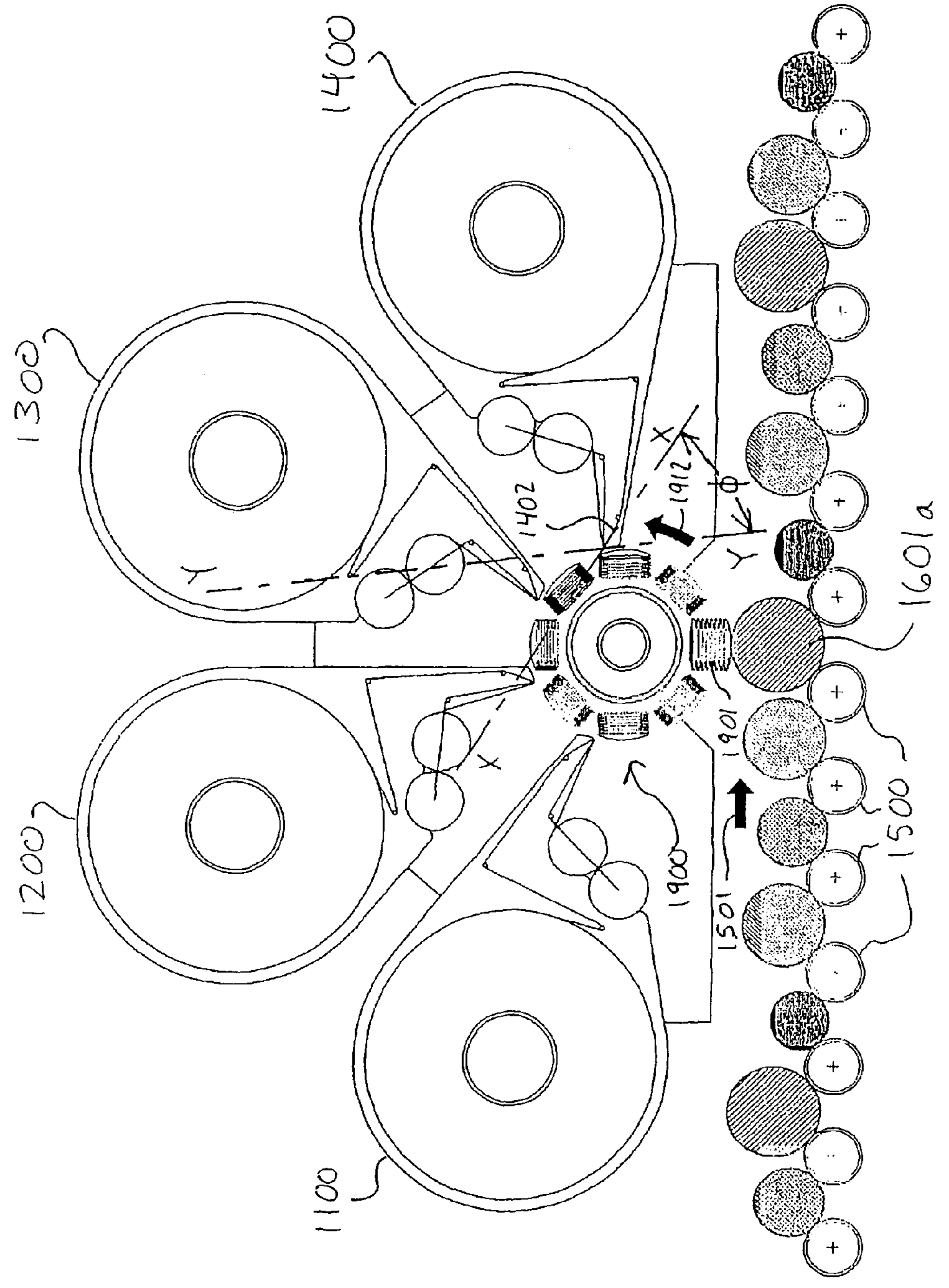
FIG. 3 is a schematic representation of an alternate form of the invention wherein four separate label cassettes are utilized together with a single rotary bellows applicator.
Figure 4:
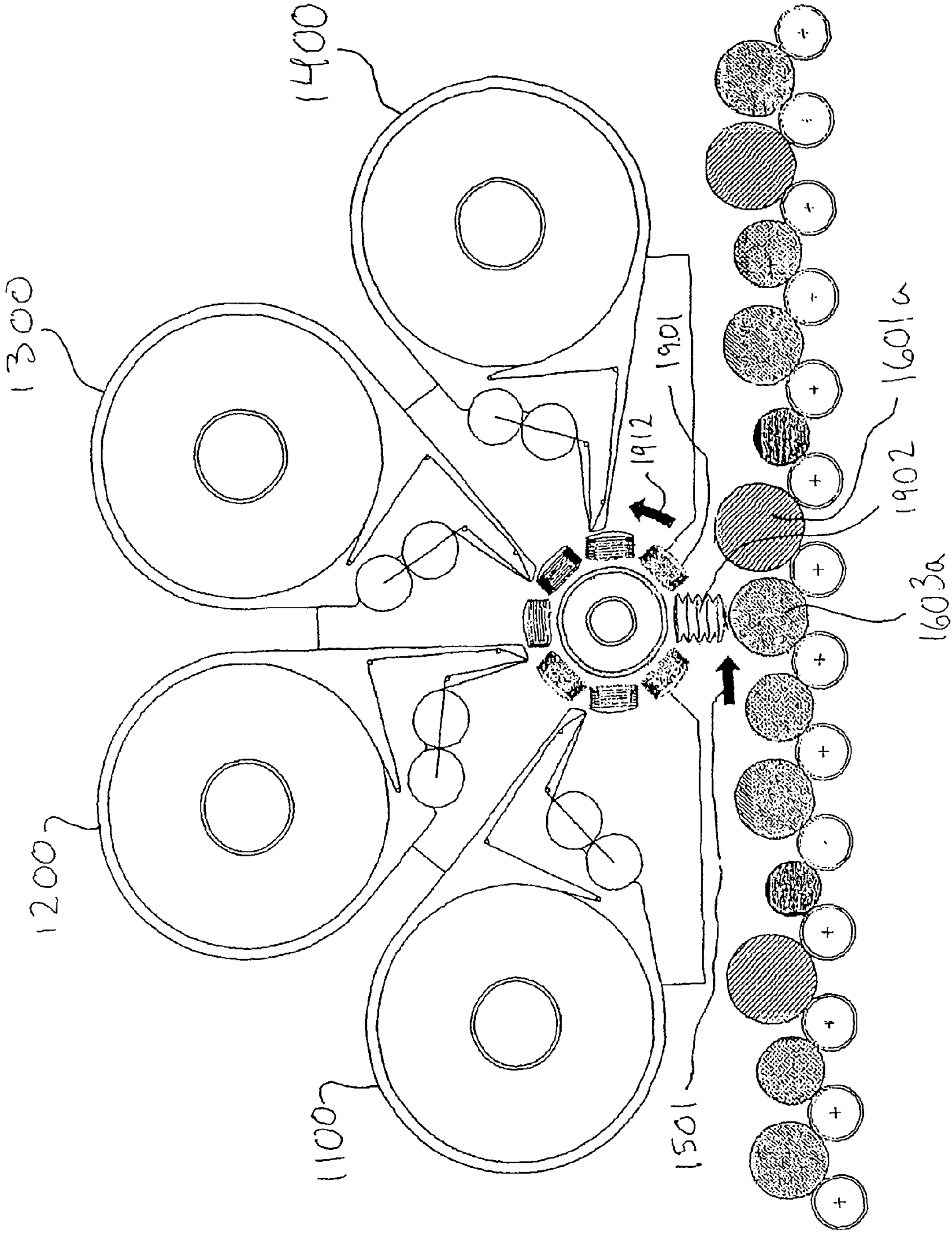
FIG. 4 is a schematic representation of the system shown in FIG. 3 after having been advanced one step from that shown in FIG. 3.

FIGS. 3 and 4 illustrate a second embodiment of the invention wherein four label cassettes 1100, 1200, 1300 and 1400 are positioned in a coplanar fashion around and above rotary bellows applicator 1900. The angle $\phi$ between guide plate 1402 and the outer circle described by the perimeter of rotary bellows applicator 1900 is approximately 50°. This angular relationship allows the use of four label cassettes as opposed to the three cassettes utilized in FIGS. 1 and 2. As the angle $\phi$ is increased, it becomes possible to use a greater number of cassettes, each of which is somewhat smaller than is the case when a lower number of cassettes is utilized. It is important that the cassettes be arranged in a coplanar fashion in order to apply the labels to the center of each individual bellows. It is also important that the cassettes form an arc not substantially more than 180° in order to remain comfortably above the conveyed produce.

FIG. 3 illustrates an "extra large" label being applied to produce item 1601*a* by individual bellows 1901.

FIG. 4 illustrates the system of FIG. 3 wherein the conveyor 1500 and the rotary bellows applicator have been moved in the direction of arrows 1501 and 1912 one step. The extra large produce item 1601*a* has moved one step to the right in FIG. 4 from that illustrated in FIG. 3. The individual bellows 1901 has rotated one step in a counterclockwise direction from that shown in FIG. 3. In FIG. 4 rotary bellows applicator 1902 is shown fully extended and applying a "small" label to produce item 1603*a*.

Figure 5:
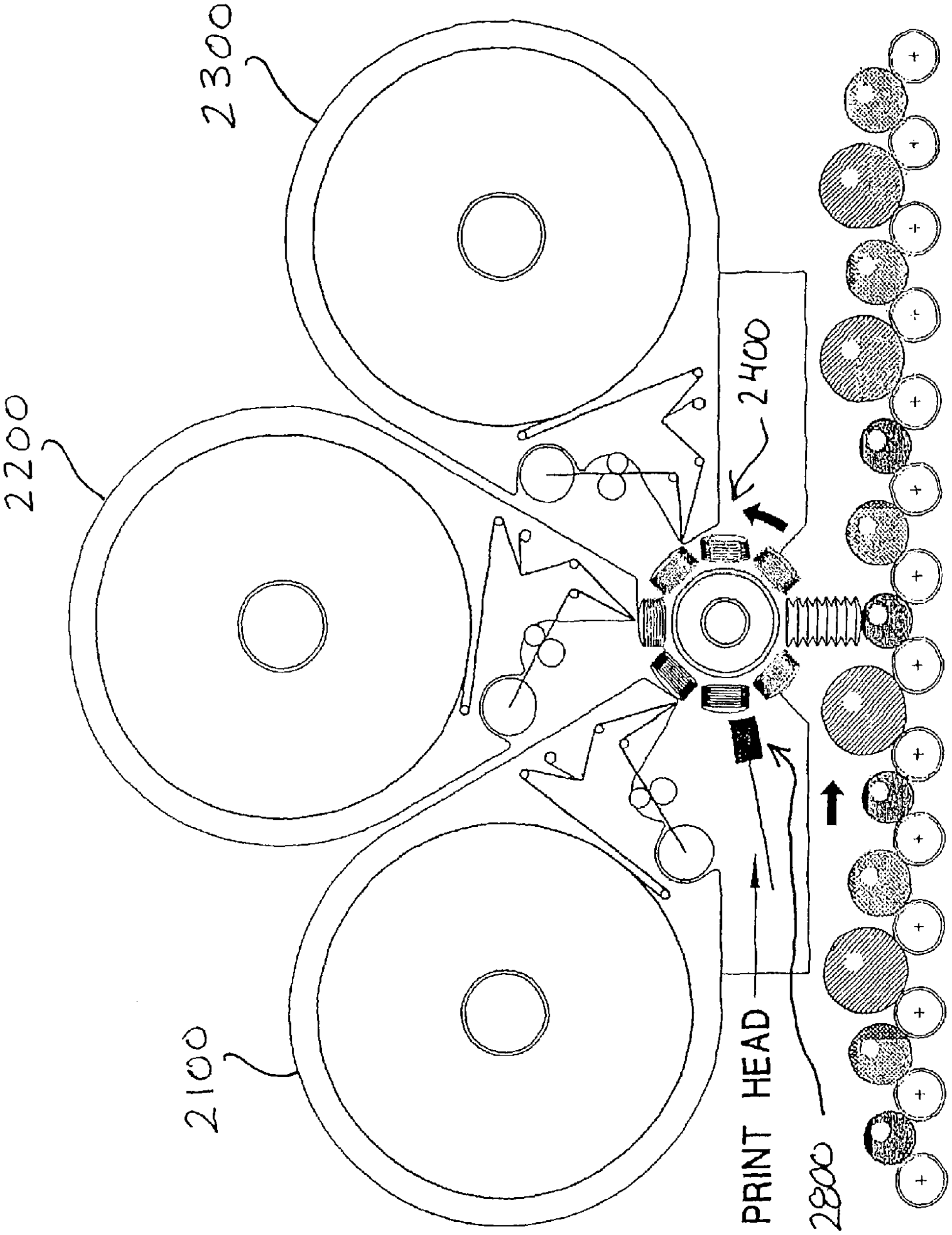
FIG. 5 is a schematic representation of yet another form of the invention utilizing three separate label cassettes together with a print head in conjunction with a single rotary bellows applicator.

FIG. 5 illustrates another aspect of the invention wherein three label cassettes 2100, 2200 and 2300 are aligned in a coplanar fashion and arranged angularly above rotary bellows applicator 2400. In this embodiment, a print head 2800 is positioned below and adjacent to label cassette 2100. The purpose of print head 2800 is to apply a printed legend on each label before the label is applied to a produce item. The printed legend, for example, may include a PLU (Product Look Up) code number or bar code. The three label cassettes 2100, 2200 and 2300 may carry the same labels or alternatively carry three different pre-printed labels, e.g. brand names such as "Sunkist" and other known brands, to be print coded on application.

Figure 6:
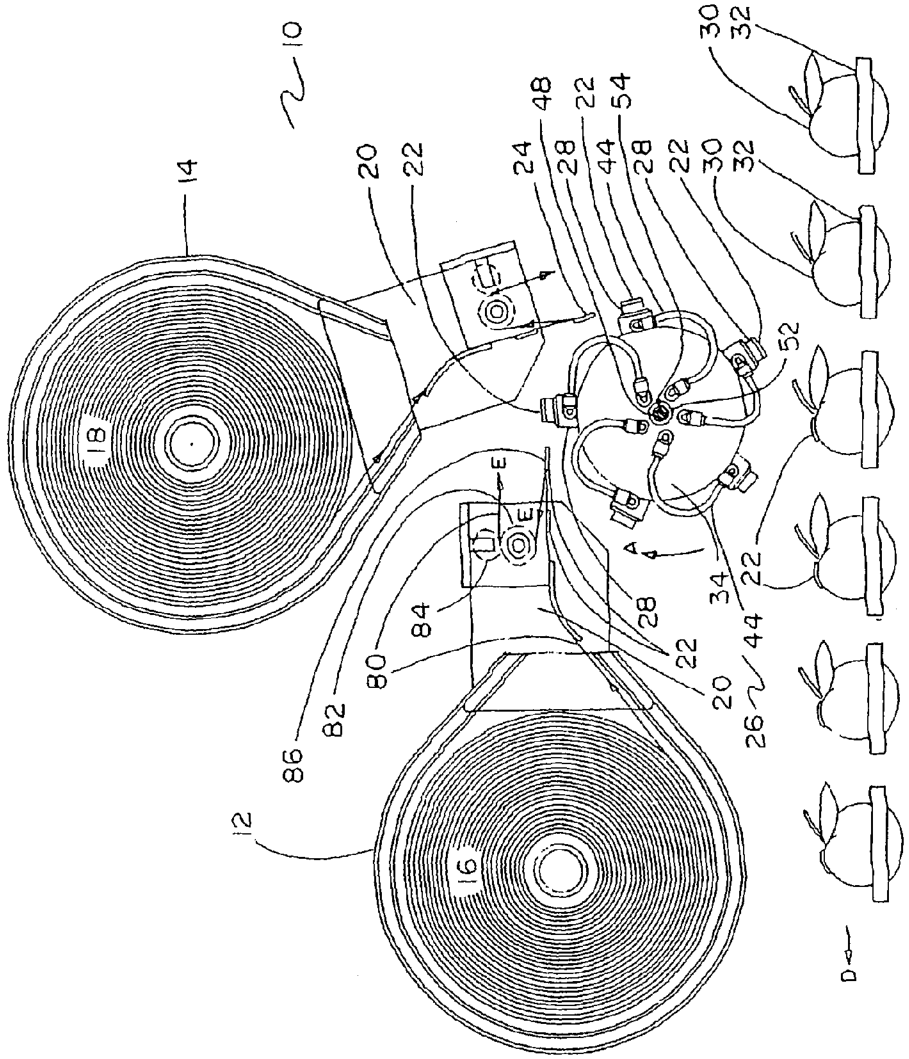
Fig. 6 PRIOR ART
FIG. 6 is an illustration of a prior art system according to Rietheimer U.S. Pat. No. 5,645,680 utilizing two label cassettes together with an applicator that does not use bellows.

FIG. 6 illustrates the prior art Rietheimer mechanism referred to at page 1 above.

Figure 7:
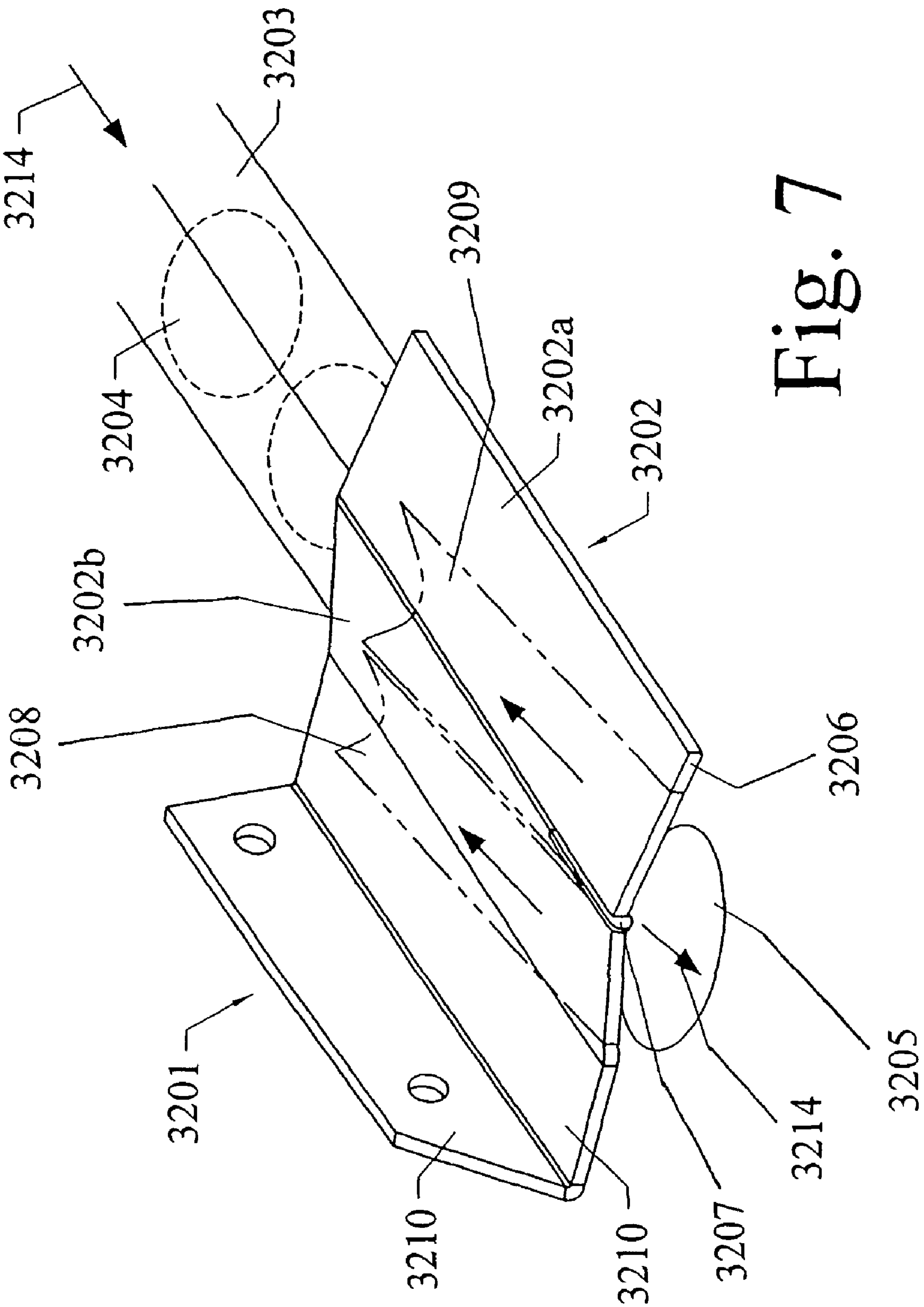
FIG. 7 is a reproduction of FIG. 3 from the parent U.S. application Ser. No. 11/222,723.

FIGS. 7 and 8 herein are reproductions of FIGS. 3 and 7, respectively, from the parent U.S. application Ser. No. 11/227,723, and are included here along with the description below to describe the stripping edge used in conjunction with the present invention. For a more complete description, see the '723 application.

FIG. 7 herein shows a produce labeler portion 3201 incorporating a guide plate used in a removable label cassette according to the present invention generally referenced 3202. A two-part split style backing tape or carrier strip 3203 carrying a number of adhesive labels, such as those referenced 3204 and 3205, respectively, is folded around the guide plate. The guide plate has, at its lower extremity, a stripping edge 3206 around which the tape is pulled causing it to be effectively folded back on itself. Stripping edge 3206 is unnotched when compared to LaMers U.S. Pat. No. 4,217,164. Stripping edge 3206 is square to or perpendicular to the axis of motion 3214 of the labels, and is essentially a straight edge bent upwardly at its center. Stripping edge 3206 forms a straight line perpendicular to the axis of motion 3214 of the labels. As the tape or carrier 3203 is pulled around the stripping edge 3206 of the guide plate 3202, the label 3204, 3205 continues to move in a forward direction shown by arrows 3214, i.e. the label 3205 remains substantially square to the run of the tape 3203 and the label's forward motion follows the direction of travel of the tape 3203 before having reached the stripping edge 3206. Arrows 3214 also indicate the "axis of motion" of labels 3204, 3205.

The underneath of the guide plate which is, in this embodiment, the region preceding the stripping edge 3206, has a surface which is bent or bowed across the run of the tape (and across the axis of motion of the labels) and, because of the way the tape is strung around the edge, must encounter the underside of the plate as or before the tape reaches the stripping edge. Each of the backing tape halves 3208 and 3209 runs on one of the flat sides 3202*a* and 3202*b* of guide plate 3202. In this configuration, the bent surface is essentially triangular or V-shaped in cross-section formed by two flat sides 3202*a* and 3202*b* of guide plate 3202, with an apex angle of between 150° and 170°, and preferably approximately 160°. At this angle, advantageous separation occurs because the label 3205 is forced or bent about its axis of motion into a shallow 'V' formation, thus momentarily imparting sufficient stiffness into the label 3205 along its axis of motion to cause it to separate from the carrier as the carrier reverses direction at the stripping edge 3206. As presented in FIG. 7 herein, the top surface of the labels would be the adhesive side of the labels.

A fin 3207 is provided as a centering guide and separates the backing tape halves 3208 and 3209 from each other. Fin 3207 is located in close proximity to the edge 3206, and is preferably formed as an integral part of the guide plate 3202. The fin 3207 centers the split line between strips 3208 and 3209, causing each strip to run on opposite sides 3202*a* and 3202*b* of the V-shaped guide plate 3206, thereby centering the labels as well. The tension in each of the two parts 3208 and 3209 of the split, two part carrier strip, is kept uniform across the width of the carrier strip 3203. Fin 3207 assures that the labels are bent in their middle to maximize the momentary stiffness of each label as it is stripped.

On the far side of the guide plate 3202 shown in FIG. 7 herein, a spacer 3210 is provided which extends essentially parallel to the top surface of the guide plate and along one of the lateral edges in order to allow the guide plate to be fixed into a produce labeler. A spacer is commonly used in such circumstances to provide operational clearance and may take a number of forms. Such a spacer may also be attached to either side 3202*a*, 3202*b* of the guide plate 3202.

FIG. 8 herein is a schematic representation of the present invention showing how guide plate 3202 and the axis of motion of labels, such as 3205, forms an angle ϕ with respect to upper surface 405*a* of bellows 405 as shown, for example, in FIG. 1. Angle ϕ may range from 10° to 90°, but preferably is between 30° to 60°.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. Apparatus for automatically applying labels to produce, wherein a rotary bellows applicator carries a plurality of bellows, and each of said bellows has an upper surface, and wherein adhesive labels are carried in a label cassette wherein a label carrier strip moves along an axis of motion along a guide plate to a stripper edge, wherein said stripper edge forms a straight line perpendicular to said axis of motion, and wherein said labels are stripped from said label carrier strip and are transferred to said upper surface of a rotating bellows and thereafter applied by said bellows to the produce, comprising a rotary bellows applicator, three or more label cassettes angularly, disposed adjacent said applicator, and conveyor means for conveying singulated produce items past said rotary bellows applicator, wherein each of said label cassettes includes a guide plate having said stripper edge, and wherein said guide plate forms an angle ϕ with said upper surface of said rotary bellows applicator when said upper surface is adjacent said stripper edge, wherein ϕ is between 30° and 60°.

2. The apparatus of claim 1 wherein said cassettes form an arc of approximately 180°.

3. The apparatus of claim 2 wherein four label cassettes are utilized.

4. The apparatus of claim 1 further comprising a print head positioned adjacent one of said label cassettes.

5. In an apparatus for automatically applying labels to produce, wherein a rotary bellows applicator carries a plurality of bellows, and each of said bellows has an upper surface, and wherein label cassettes are utilized having adhesive labels carried on a split, two part carrier strip that move along an axis of motion along a guide plate to a stripper edge, are stripped from said carrier strip and are transferred to said upper surface of a rotating bellows and thereafter applied by said, bellows to the produce, wherein said guide plate of each cassette has a generally V-shape for momentarily bending each of said labels about said axis of motion of said labels as said labels approach said stripper edge, wherein said V-shape forms an angle of between 150° and 170°, wherein said V-shape is formed by two flat sides, and wherein each part of said two part carrier strip runs on one of said flat sides, and wherein said stripper edge forms a straight line perpendicular to said axis of motion, wherein the tension in each of the parts of said split, two part carrier strip is kept uniform across the width of said carrier strip, the improvement comprising:

three or more label cassettes angularly disposed adjacent said applicator, and conveyor means for conveying singulated produce items past said rotary bellows applicator, wherein each of said label cassettes includes a guide plate having said stripper edge, and wherein said guide plate forms an angle ϕ with said upper surface of said rotary bellows applicator when said upper surface is adjacent said stripper edge, wherein ϕ is between 30° and 60°.

* * * * *